United States Patent [19]

Kwack et al.

[11] Patent Number: 4,705,829

[45] Date of Patent: Nov. 10, 1987

[54] LOW DENSITY POLYETHYLENE RESIN COMPOSITIONS AND THERMOPLASTIC FILMS THEREOF

[75] Inventors: Tae H. Kwack, Fairport, N.Y.; Tien-Kuei Su, Belle Mead, N.J.

[73] Assignee: Mobil Oil Corporation, New York, N.Y.

[21] Appl. No.: 851,016

[22] Filed: Apr. 11, 1986

[51] Int. Cl.$^4$ ............. C08L 23/18; C08L 23/20; C08L 23/08
[52] U.S. Cl. .................................................. 525/240
[58] Field of Search ........................................ 525/240

[56] References Cited

U.S. PATENT DOCUMENTS

| | | | |
|---|---|---|---|
| 3,179,719 | 4/1965 | Cines | 525/240 |
| 3,183,283 | 5/1965 | Reding | 525/240 |
| 4,339,507 | 7/1982 | Kurtz et al. | 525/240 |
| 4,429,079 | 1/1984 | Shibata et al. | 525/240 |
| 4,438,238 | 3/1984 | Fukushima et al. | 525/240 |
| 4,525,322 | 6/1985 | Page et al. | 525/240 |
| 4,536,550 | 8/1985 | Moriguchi et al. | 525/240 |

*Primary Examiner*—Carman J. Seccuro
*Attorney, Agent, or Firm*—A. J. McKillop; M. G. Gilman; H. M. Flournoy

[57] ABSTRACT

Terblends of linear low density polyethylene resins provide enhanced processability and improved output without losing overall film properties.

10 Claims, No Drawings

LOW DENSITY POLYETHYLENE RESIN COMPOSITIONS AND THERMOPLASTIC FILMS THEREOF

CROSS REFERENCE TO RELATED APPLICATIONS

This application is related to Ser. No. 800,929, filed Nov. 22, 1985 and entitled Improved Low Density Polyethylene Resin Composition and Thermoplastic Films Thereof; and to Ser. No. 810,117, filed Dec. 18, 1985 and entitled Low Density Polyethylene Resin Compositions and Thermoplastic Films Thereof.

BACKGROUND OF THE INVENTION

This invention relates to compositions comprising terblends of linear low density polyethylene (LLDPE) resins having increased extrudability, overall processability, and output; said blends provide films of high quality without losing overall film properties.

It is a well known fact that linear low density polyethylene copolymers generally produce films of high quality when compared to high pressure or branched low density polyethylenes (HP-LDPE). LLDPE films exhibit higher tensile strength, outstanding puncture resistance, and enhanced impact strength. However, the extrudability of LLDPE resins is poor, mainly because of high shear viscosity. Due to the absence of long chain branching, the shear viscosity of LLDPE exhibits less shear thinning behavior than branched LDPE. This non-newtonian rheological behavior brings about extrusion difficulties; that is, limits the extrusion head pressure and results in high motor amperage and high torque and prevents increasing the output under a given set of extrusion conditions.

Furthermore, the extrusion problem is frequently accompanied by the appearance of surface irregularities on the produced film. Surface irregularities or, more generally, "melt fracture" occur over a range of shear rate depending on the molecular characteristics of the polymer. These are characterized by closely spaced circumferential ridges along the extrudate when extruded through a capillary die. In a more severe form, it resembles what is generally known as "sharkskin". The onset of melt fracture is believed to occur at or above a critical shear stress, although the concept is yet fully understood.

In the past many attempts were made to alleviate the above-mentioned extrusion problems. For example, preparation of blends of linear low density polyethylenes with branched or high pressure low density polyethylene are known. Employing various kinds of processing aids; such as, low molecular weight hydrocarbons, fatty amides or bis amides, fluoroelastomers and certain silicon polymers, is also known.

The above-recited disadvantages of LLDPEs are substantially overcome by the resin blends of this invention. We have now discovered that improved LLDPE resin compositions are provided by incorporating (1) high MI and (2) high MFR LLDPE resins into low MI linear low density polyethylenes.

BRIEF DESCRIPTION OF THE INVENTION

This invention is directed to thermoplastic polymer resin blends of at least three distinctly different resins comprising (1) a high MI linear low density polyethylene (LLDPE), (2) a high MFR LLDPE and (3) a low MI LLDPE. The low MI LLDPE also has a low MFR and comprises about 50 to 90 wt. % or more of the total resin composition. The low MI polyolefin resin is blended with about 5 to about 45 wt. % of a high MFR linear low density polyethylene and about 5 to about 15 wt. % of the high MI polyethylene to provide resin compositions of increased extrudability and improved output and which concomitantly provide films without the loss of overall film quality.

The techniques of this invention are generally applicable to any low MI polyethylene resin composition that is difficult to extrude, especially a low MI, low MFR resin.

DETAILED DESCRIPTION OF THE INVENTION

It is an object of this invention to provide compositions whereby the extrudability and processability of difficult-to-extrude low melt index (MI) linear low density polyethylene resins is increased. It is a further object of this invention to provide compositions of linear low density polyethylene resins of increased output without the films produced therefrom losing overall film quality.

In accordance with the present invention, the extrudability of low MI (melt index) linear low density polyethylene resins is increased by the addition thereto of (1) high MI LLDPE and (2) high MFR (melt flow ratio) resins. The blends of the present invention may comprise about 45 to about 90 wt. % of low MI polyethylene resin, about 5 to about 45 wt. % of high MFR resin and about 5 to about 15 wt. % of high MI LLDPE. Preferred compositions comprise 50 to about 70 wt. % of low MI polyethylene resin, about 20 to about 40 wt. % of high MFR polyethylene and about 5 to about 10 wt. % of high MI LLDPE.

The base linear low density polyethylene resin comprises an LLDPE resin having a low MI and a low MFR. This combination of properties is typical of LLDPE resins which are difficult to extrude. It is to be understood that low MI values are those values which are less than about 5 and, preferably, from about 0.4 to about 2–5. The essential characteristic is that the base resin must also have a low MFR, namely, less than about 50, and be difficult to extrude. Such resins require increased amperage to provide equivalent outputs or at lower amperages provide lower outputs.

The high MI LLDPE may have a high MFR or a low MFR, but it must have a high MI.

Any suitable LLDPE may be used to provide the LLDPE of high MFR. It may have a low MI or a high MI so long as it has a high MFR. High MFR's, as defined herein, are MFRs which may vary from about 50 to about 100 and, preferably, from about 50 to about 75.

It is to be understood that at least three separate and distinct LLDPE resins, each individually having (1) a low MI, (2) a high MI and (3) a high MFR are to be utilized herein.

The blending of the polymers may be accomplished in any way known to those skilled in the art. Thus, a physical mixture of the polymers in powder or in pellet form can be blended into a uniform composition by Banburying or by milling the composition on calendar rolls using temperatures above the melting point in the higher melting component. In a preferred embodiment, a rough mixture of the polymers is put through a melt extruder containing a mixing extrusion screw or a mixing section on the extrusion screw. The resins may also be in the form of granules and may be blended as either granules or pellets or mixtures thereof. The resins in accordance with this invention were dry blended using a rotary mixer and then fed to a hopper and blown films produced therefrom. Other means of obtaining a homogenous blend will be apparent to those skilled in the art.

As in other polyolefin compositions, stabilizers, antioxidants, pigments, fillers and similar additives can be incorporated into the blends of the present invention. The compositions of the present invention are outstanding as film resins, especially in bag applications.

The term "linear low density polyethylene" as used herein usually refers to copolymers of ethylene and $C_4$–$C_8$ alpha olefins. Accordingly, representative alpha olefins include, but are not limited to, 1-butene, 4-methyl-1-pentene, 1-hexene, 1-octene and 1-decene. They may be prepared by any suitable low pressure technique, i.e., the Unipol or Solution process. The Unipol process is described in Chem Tech, April 1985, by F. J. Karol, pp. 222-228.

Generally, the LLDPEs useful herein contain up to about 10 wt. % of polymerized alpha olefin and have a density between about 0.9 to about 0.94, preferably less than 0.930. The melt index (MI) of the base low MI LLDPE usually is from about 0.4 or less to about 5 and preferably, from about 0.6 to about 2 and the molecular weight distribution Mw/Mn varies from about 2 to 10 and, preferably, from about 2 to 7.

The preparation of a typical LLDPE is described in U.S. Pat. No. 4,243,619, which is incorporated herein by referecne. Many suitable linear low density polyethylenes are available commercially from sources such as Union Carbide, Exxon Chemical, Mobil Chemical and Dow Chemical. They may, however, be prepared in any convenient manner known to the art if desired. Various conventional additives; such as slip agents, antiblocking agents and antioxidants, can be incorporated in the films produced therefrom in accordance with known techniques for their known purpose.

It has been found that the selection of the particular resins and their proportions are critical factors in obtaining the increased extrudability and, ultimately, films of high quality.

Details of the control or base resin (low MI, low MFR LLDPE resin) and the high MFR and high MI LLDPE resins, i.e., the characterization data for the exemplary resins, are described in Table I. Resin A (the base resin or control resin) is a low MI, low MFR LLDPE. Resin B is a high MI LLDPE. Resin C is high MFR LLDPE resin. The pertinent characteristics of each of these resins is given in Table I. Preferably the high MI resin has a low MFR and the high MFR resin has a low MI. The essential characteristics are that the terblend consist of a low MI LLDPE, a high MFR LLDPE and a high MI LLDPE.

Table II describes the results of extrudability tests on various terblend compositions comprising these three resins using a 2½" extruder and 8" die. Examples 2–8 were in accordance with the invention and Example 1 was 100% of resin A. The extrudability (lb/hr/in) of each terblend showed greater values than that of the control resin (resin A). Output increase was examined for each composition at the same head pressure as that of the control. Depending on the specific composition, the % increase in output varies from 19% to 66%. Melt tension values were taken and the higher melt tension values of the improved resin blends in accordance with this invention in comparison to Example 1 (resin A) clearly show their superior bubble stability. Table III describes the results of film property evaluation. It discloses that film indices of the various compositions, except No. 8, are comparable to the control film.

The following non-limiting examples are merely illustrative unless specified otherwise.

EXAMPLES 1-8

Example 1 is the base resin (control low MI, low MFR resin). Examples 2–8 are blends in the indicated percentages of the described resins (A, B and C). Table 1 summarizes some of the important characterization data of the various resins utilized herein. Resins A, B and C, as noted hereinabove, are all linear low density polyethylene resins and can be obtained commercially.

The extrudability of resin blends in accordance with this invention was compared to a control resin (resin A) comprised solely of said low MI/low MFR of an LLDPE. Extrudability test results as noted and discussed above are summarized in Table II.

TABLE I

| | Resin Characterization Data | | | | | | | |
|---|---|---|---|---|---|---|---|---|
| Resin | $I_2$ | $I_{20}$ | $I_{20}/I_2$ | Melt Tension at Break | Density | Mw | Mn | Mw/Mn |
| A | 1.0 | 25.5 | 25.5 | 2.3 | 0.9213 | 116,800 | 35,900 | 3.3 |
| B | 25.0 | 577 | 23.1 | 0.21 | 0.924 | 57,342 | 16,733 | 3.427 |
| C | 0.7 | 52.3 | 74.7 | 3.6 | 0.9216 | 136,094 | 17,086 | 7.965 |

A: Union Carbide (low MI, low MFR)
B: Mobil Chemical (high MI)
C: Union Carbide (high MFR)

TABLE II

| | | Results of Extrudability Tests | | | | | |
|---|---|---|---|---|---|---|---|
| Example No. | Resin Composition | Output Setting Point (RPM) | Head Pressure (psi) | Motor Amperage (amps) | Melt Temperature (°F.) | Output (lbs/hr/in) | % Output Increase |
| 1 | A | 40 | 6600 | 57.5 | 455 | 4.65 | |
| 2 | A/C/B (85/10/5) | 47 | 6600 | 58.0 | 460 | 5.55 | 19.35 |
| 3 | A/C/B (80/15/5) | 49 | 6600 | 58.5 | 464 | 5.91 | 27.1 |
| 4 | A/C/B (75/20/5) | 50 | 6600 | 59.0 | 464 | 6.03 | 29.67 |

TABLE II-continued

Results of Extrudability Tests

| Example No. | Resin Composition | Output Setting Point (RPM) | Head Pressure (psi) | Motor Amperage (amps) | Melt Temperature (°F.) | Output (lbs/hr/in) | % Output Increase |
| --- | --- | --- | --- | --- | --- | --- | --- |
| 5 | A/C/B (75/25/5) | 52 | 6600 | 58.0 | 464 | 6.33 | 36.13 |
| 6 | A/C/B (70/20/10) | 58 | 6600 | 60 | 464 | 7.04 | 51.39 |
| 7 | A/C/B (60/30/10) | 62 | 6600 | 60 | 465 | 7.40 | 59.14 |
| 8 | A/C/B (50/40/10) | 74 | 6600 | 61 | 469 | 7.76 | 66.88 |

TABLE III

Results of Film Property Evaluation

| Example No. | Resin Composition | Yield (psi) MD | Yield (psi) TD | Ultimate (psi) MD | Ultimate (psi) TD | Elongation (%) MD | Elongation (%) TD | Toughness (ft/in) MD | Toughness (ft/in) TD | Modulus (psi) MD | Modulus (psi) TD | Tear (gms/mil) MD | Tear (gms/mil) TD | Spencer | Film Index |
| --- | --- | --- | --- | --- | --- | --- | --- | --- | --- | --- | --- | --- | --- | --- | --- |
| 1 | A | 1669 | 1762 | 4671 | 3982 | 667 | 796 | 1331 | 1406 | 34666 | 40925 | 362 | 800 | 78 | 147 |
| 2 | A/C/B (85/10/5) | 1631 | 1795 | 4636 | 3892 | 664 | 822 | 1326 | 1414 | 34788 | 44731 | 259 | 931 | 77 | 148 |
| 3 | A/C/B (85/15/5) | 2639 | 2786 | 4912 | 3777 | 658 | 815 | 1363 | 1374 | 36020 | 43799 | 239 | 901 | 77 | 148 |
| 4 | A/C/B (75/20/5) | 1653 | 1813 | 4789 | 3929 | 661 | 851 | 1369 | 1482 | 34816 | 44439 | 226 | 891 | 77 | 149 |
| 5 | A/C/B (70/25/5) | 1607 | 1829 | 4650 | 3591 | 688 | 819 | 1380 | 1376 | 35532 | 43431 | 250 | 1021 | 77 | 144 |
| 6 | A/C/B (70/20/10) | 1658 | 1841 | 4245 | 3668 | 676 | 845 | 1297 | 1423 | 35474 | 43403 | 256 | 989 | 77 | 144 |
| 7 | A/C/B (60/30/10) | 1676 | 1822 | 4791 | 3452 | 682 | 813 | 1423 | 1323 | 36111 | 43527 | 228 | 960 | 77 | 144 |
| 8 | A/C/B (50/40/10) | 1704 | 1779 | 4555 | 3313 | 644 | 794 | 1310 | 1261 | 35291 | 43200 | 218 | 974 | 75 | 139 |

The above data clearly show the advantages of the present invention. The substantial drop in pressure, the substantial increase in output with ampere drop without loss of overall film quality. Films processed from the novel resin compositions embodied herein provide dramatic and highly indicative evidence of the overall improvement of resin blends in accordance with the present invention.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

We claim:

1. A thermoplastic resin blend which provides enhanced processability and improved output without loss of overall film properties comprising a terblend of linear low density polyethylene resins consisting essentially of three distinct and different resins selected from (1) an LLDPE having a low MI of from about 0.4 to about 5 and a low MFR of less than about 50; (2) an LLDPE having a high MFR of from about 50 to about 100 and a low MI of from about 0.4 to about 5; and (3) an LLDPE having a high MI of 25 or greater and a low MFR of less than about 50, said terblend comprising from about 45 to about 90 wt % of component (1), from about 5 to about 45% of component (2) and from about 5 to about 15 wt % of component (3).

2. The resin blend of claim 1 in which said low MI/low MFR LLDPE is a copolymer of ethylene and a $C_4$-$C_8$ alpha olefin.

3. The resin blend of claim 2 wherein said low MI/low MFR LLDPE resin is a copolymer of ethylene and an alpha-olefin selected from the group consisting of 1-butene, 4-methyl-1-pentene, 1-hexene, 1-octene and 1-decene.

4. The resin blend of claim 3 in which said low MI/low MFR LLDPE resin is a copolymer of ethylene and 1-butene.

5. The resin blend of claim 3 in which said low MI/low MFR LLDPE is a copolymer of ethylene and 1-hexene.

6. A clear blown film prepared from a resin blend comprising a terblend which provides enhanced processability and improved output without loss of overall film properties comprising a terblend of linear low density polyethylene resins consisting essentially of three distinctly different resins selected from (1) an LLDPE having a low MI of from about 0.4 to about 5 and a low MFR of less than about 50; (2) an LLDPE having a high MFR of from about 50 to about 100 and a low MI of from about 0.4 to about 5; and (3) an LLDPE having a high MI of 25 or greater and a low MFR of less than about 50, said terblend comprising from about 45 to about 90 wt % of component (1), from about 5 to about 15% of component (2) and from about 5 to about 45 wt % of component (3).

7. The film of claim 1 wherein said low MI/low MFR linear low density polyolefin is a copolymer of ethylene and an alpha olefin selected from the group consisting of 1-butene, 4-methyl pentene, 1-hexene, 1-octene and 1-decene.

8. The film of claim 7 wherein said alpha olefin is 1-butene.

9. The film of claim 7 wherein said alpha olefin is 1-hexene.

10. The film of claim 7 wherein said alpha olefin is 1-octene.

* * * * *

UNITED STATES PATENT AND TRADEMARK OFFICE
CERTIFICATE OF CORRECTION

PATENT NO. : 4,705,829

DATED : November 10, 1987

INVENTOR(S) : Tae Hoon Kwack & Tien-Kuei Su

It is certified that error appears in the above-identified patent and that said Letters Patent is hereby corrected as shown below:

Col. 3, Line 32 - "referecne" should be --reference--

Col. 5 - Table II, Example No. 5 should read --(70/25/5)-- not "(75/25/5)"

Col. 5, Line 65 - "$C_4$-$C_8$alpha" should be read --$C_4$-$C_8$ alpha--

Signed and Sealed this

Twenty-first Day of June, 1988

*Attest:*

DONALD J. QUIGG

*Attesting Officer*   *Commissioner of Patents and Trademarks*

UNITED STATES PATENT AND TRADEMARK OFFICE
CERTIFICATE OF CORRECTION

PATENT NO. : 4,705,829

DATED : November 10, 1987

INVENTOR(S) : Tae Hoon Kwack and Tien-Kuei Su

It is certified that error appears in the above-identified patent and that said Letters Patent is hereby corrected as shown below:

Col. 6, Claim 6, Lines 54 & 55, please correct "5 to about 15%" to read --5 to about 45%--, and correct "5 to about 45 wt %" to read to --5 to about 15 wt %--

Signed and Sealed this

Third Day of January, 1989

*Attest:*

DONALD J. QUIGG

*Attesting Officer*     *Commissioner of Patents and Trademarks*